(12) United States Patent
Lee et al.

(10) Patent No.: US 7,295,099 B2
(45) Date of Patent: Nov. 13, 2007

(54) HOME APPLIANCE NETWORK SYSTEM AND METHOD FOR OPERATING THE SAME

(75) Inventors: Sang Kyun Lee, Kyungki-do (KR); Dae Sung Wang, Seoul (KR)

(73) Assignee: LG Electronics Inc., Seoul (KR)

( * ) Notice: Subject to any disclaimer, the term of this patent is extended or adjusted under 35 U.S.C. 154(b) by 209 days.

(21) Appl. No.: 10/896,844

(22) Filed: Jul. 23, 2004

(65) Prior Publication Data
US 2005/0088276 A1 Apr. 28, 2005

(30) Foreign Application Priority Data
Oct. 9, 2003 (KR) ............... 10-2003-0070322

(51) Int. Cl.
*H04Q 9/00* (2006.01)
*H03M 11/00* (2006.01)

(52) U.S. Cl. .............. 340/5.54; 340/5.72; 341/33; 341/22

(58) Field of Classification Search .......... 340/3.3, 340/825.52, 825.56; 398/106; 700/1
See application file for complete search history.

(56) References Cited

U.S. PATENT DOCUMENTS

| | | | | |
|---|---|---|---|---|
| 5,537,104 A | * | 7/1996 | Van Dort et al. | 340/825.52 |
| 6,791,467 B1 | * | 9/2004 | Ben-Ze'ev | 340/825.69 |
| 6,919,790 B2 | * | 7/2005 | Kanazawa | 340/5.21 |
| 6,987,462 B2 | * | 1/2006 | Bae et al. | 340/825.72 |
| 2002/0163534 A1 | | 11/2002 | Choi et al. | |
| 2003/0018776 A1 | | 1/2003 | Yoon et al. | |
| 2003/0182412 A1 | | 9/2003 | Lee et al. | |
| 2004/0006647 A1 | | 1/2004 | Kim et al. | |

FOREIGN PATENT DOCUMENTS

| | | |
|---|---|---|
| CN | 1381781 | 11/2002 |
| CN | 1427584 | 7/2003 |
| KR | 10 0435991 | 11/2002 |

OTHER PUBLICATIONS

U.S. Appl. No. 10/869,880 to Lee, filed Jun. 18, 2004.
English language Abstract Korean No. 10-0435991.
English Language Abstract of CN 1381781.
English Language Abstract of CN 1427584.

* cited by examiner

*Primary Examiner*—Jeffery Hofsass
*Assistant Examiner*—Scott Au
(74) *Attorney, Agent, or Firm*—Greenblum & Bernstein, P.L.C.

(57) ABSTRACT

Disclosed herein are a home appliance network system and a method for operating the same. The home appliance network system comprises a plurality of home appliances connected to a network constructed in a home for transmitting and receiving data over the network, and a home server including a device monitoring module for independently storing and updating state information or product information of a specific one of the home appliances based on an input control command. When a user monitors product information of the home appliances to control the home appliances, the home server more rapidly displays the product information, resulting in an improvement in control speed. Further, the home server uses a smaller amount of network system resources, thereby enabling efficient networking to be made.

14 Claims, 5 Drawing Sheets

HOME APPLIANCE NETWORK SYSTEM AND METHOD FOR OPERATING THE SAME

BACKGROUND OF THE INVENTION

1. Field of the Invention

The present invention relates to home appliance network systems, and more particularly to a home appliance network system and a method for operating the same, wherein a device monitoring module is used to independently store and update product information of a plurality of home appliances connected to a network, thereby making it possible to rapidly monitor the product information of the home appliances using a small amount of network system resources.

2. Description of the Related Art

FIG. 1 shows the configuration of a general home appliance network system.

In general, a home network system (or home appliance network system) means a system wherein a plurality of home appliances installed in a home, including a personal computer (PC), are equipped with network interfaces, respectively, so that they can be networked and thus integrated in one network constructed in the home to transmit and receive data to/from one another over the network to control one another.

With the rapid spread of the Internet, followed by the significant increase in the number of Internet users, recently, home servers for management/control of home network systems have been equipped with Internet modems so that home appliance users can not only collect information over the Internet in homes, but also access the home servers over the Internet from remote locations to control home appliances connected to networks constructed in the homes.

Such a general home appliance network system includes, as 10 shown in FIG. 1, a plurality of home appliances H1-H4 connected to a network constructed in a home, and a home server 1 for controlling the home appliances H1-H4. As recently proposed, each of the home appliances H1-H4 is additionally provided with an Internet access function in a process of being manufactured to be controllable over the network, so that a user can use the Internet at any place in the home through the use of home appliances other than a PC.

In the home appliance network system, particularly, the user can not only recognize state information of a specific home appliance at any place inside of the home, but also control the specific home appliance through the use of control means, such as a computer, at any place outside of the home. In this regard, the home appliance network system has obtained favorable responses from many consumers, and thus has become more widespread in its application day by day.

However, in the above-mentioned home appliance network system, in order to monitor the states of the home appliances H1-H4 to control those appliances, the user personally sends a control signal to each of the home appliances H1-H4 over the network through the home server 1, and each of the home appliances H1-H4 receives and analyzes the sent control signal and sends its own state information to the home server 1 according to a result of the analysis so that the user can recognize the state information.

As a result, whenever the user attempts to monitor the states of the home appliances H1-H4, the home server 1 has to repeat an operation of sending a control signal to each of the home appliances H1-H4 and displaying product information or state information, sent from each of the home appliances H1-H4 in response to the control signal, to provide a visual indication of the product information or state information to the user, resulting in a lengthy period of time being required from the input of a state monitoring signal by the user until the information display.

The above-mentioned home appliance network system has another disadvantage in that it requires a large amount of resources to smoothly carry out the above operation.

In addition, when the user attempts to search for product information of a specific one of the home appliances H1-H4 connected to the network through the home server 1, even all of the other home appliances, which need not be controlled, receive a control signal sent from the home server 1, thereby degrading efficiency and reliability of network communication.

SUMMARY OF THE INVENTION

Therefore, the present invention has been made in view of the above problems, and it is an object of the present invention to provide a home appliance network system and a method for operating the same, wherein a device monitoring module is provided in a home server to store state information of a plurality of home appliances connected to a network and efficiently and rapidly provide product information pre-stored therein to a user when the user attempts to monitor the states of the home appliances.

In accordance with an aspect of the present invention, the above and other objects can be accomplished by the provision of a home appliance network system comprising: a plurality of home appliances connected to a network constructed in a home for transmitting and receiving data over the network; and a home server for, over the network, controlling operations of the home appliances and monitoring states thereof, and independently storing and updating state information of the home appliances.

Preferably, the home server includes a device monitoring module for independently storing and updating product information or state information of a specific one of the home appliances based on an input control command.

Preferably, the device monitoring module includes a monitoring controller for analyzing a control command inputted through a user interface module and transferring the state information or product information of the specific home appliance to the user interface module according to a result of the analysis.

The device monitoring module may further include: a state information database for storing the state information of each of the home appliances connected to the network; and a product information database for storing product information of each of the home appliances.

Preferably, the device monitoring module is provided in the home server. Alternatively, the device monitoring module may be implemented as a monitoring server which is an independent device configured separately from the home server.

In accordance with another aspect of the present invention, there is provided a method for operating a home appliance network system, comprising the steps of: a) connecting a plurality of home appliances and a home server to a network constructed in a home; b) determining whether an external input control command is a command to request product information or state information of a specific one of the home appliances; and C) externally displaying the product information or state information of the specific home appliance according to a result of the determination.

In a feature of the present invention, a home server is adapted to centrally control a home appliance network, and a device monitoring module is provided in the home server to independently store and update state information of a plurality of home appliances connected to the network. Therefore, it is possible to rapidly display product information of the home appliances using a smaller amount of network system resources when a user monitors the product information to control the home appliances, resulting in an increase in efficiency of home appliance control.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
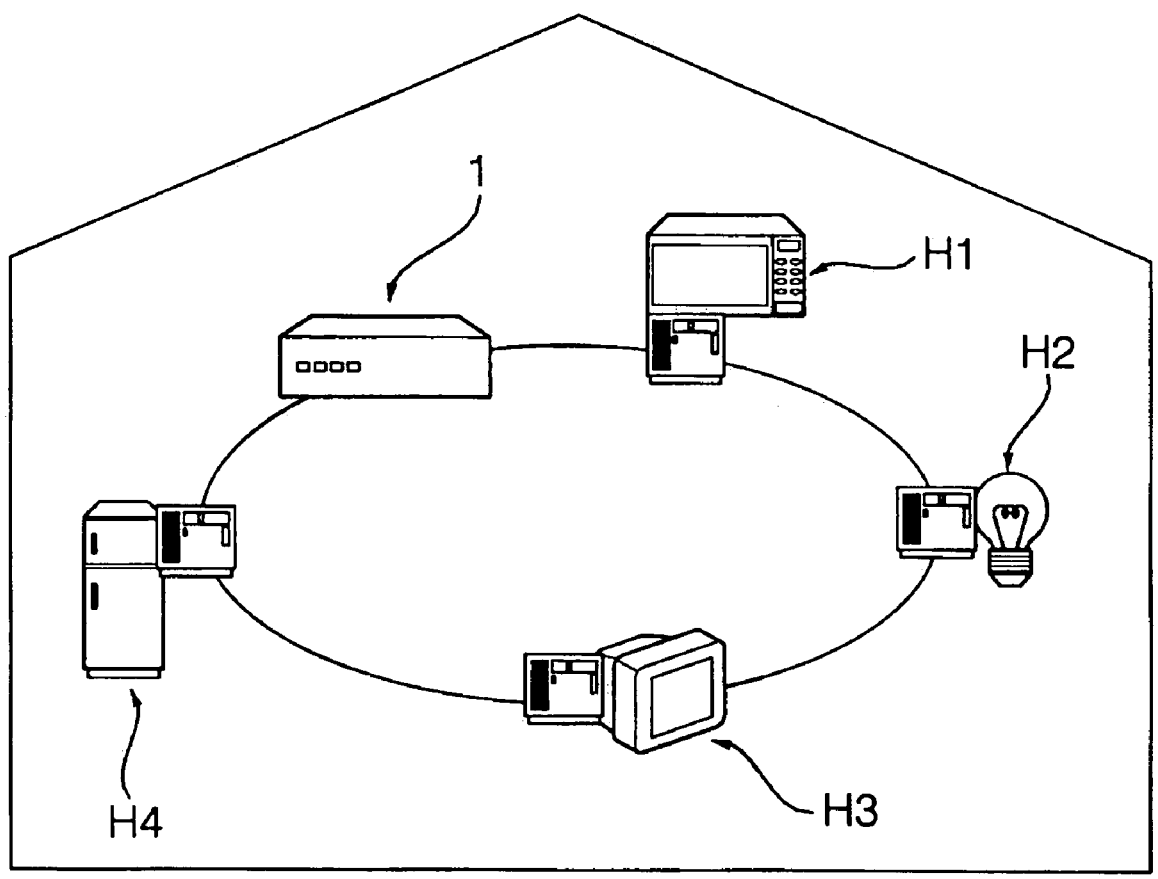
FIG. 1 is a view showing the configuration of a general home appliance network system.

Now, preferred embodiments of a home appliance network system and a method for operating the same according to the present invention will be described in detail with reference to the annexed drawings. In the drawings, the same or similar elements are denoted by the same reference numerals even though they are depicted in different drawings.

Figure 2:
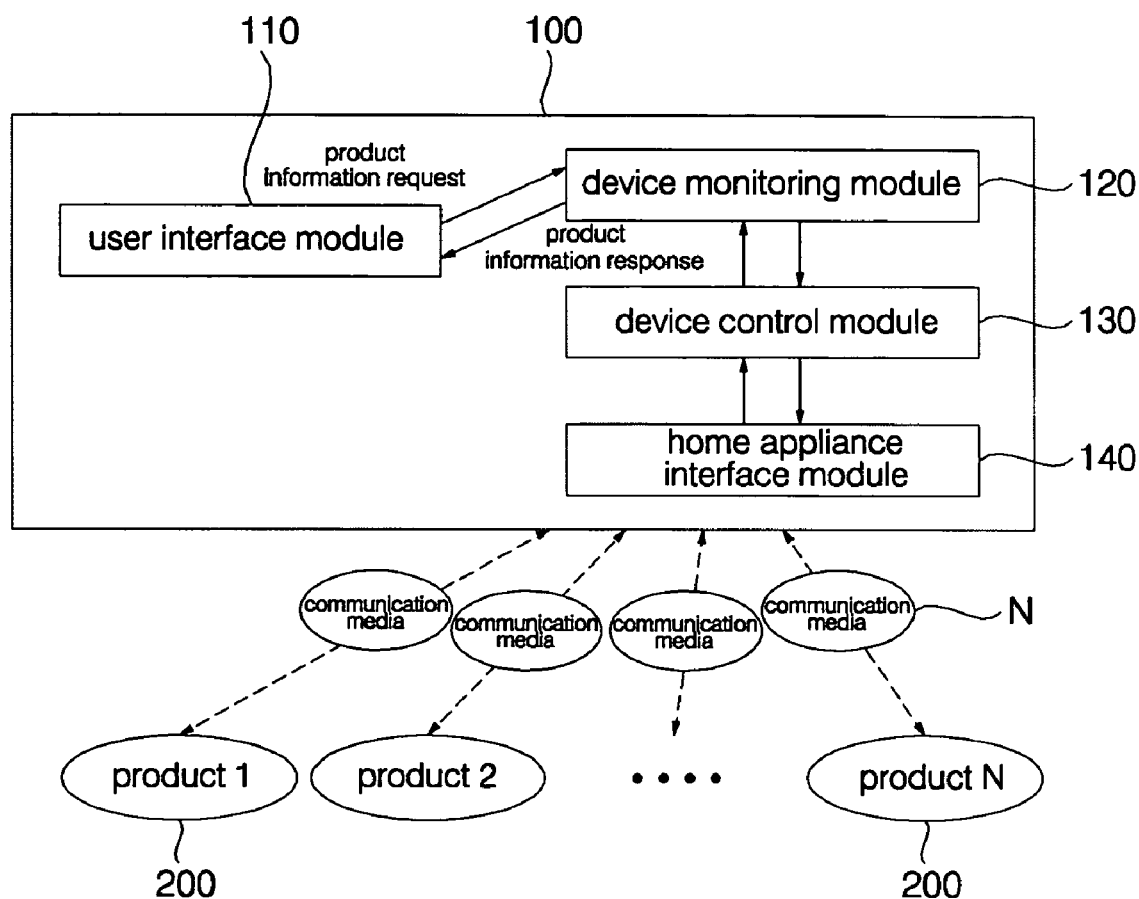
FIG. 2 is a schematic view of a home appliance network system according to the present invention.

FIG. 2 is a schematic view of a home appliance network system according to the present invention.

As shown in FIG. 2, the home appliance network system according to the present invention comprises a plurality of home appliances 200, a home server 100 for centrally controlling the home appliances 200, and communication media for constructing a network N in a home to enable transmission and reception of data between the home server 100 and the home appliances 200. The home server 100 and the home appliances 200 are connected to the network N.

The home server 100 includes a user interface module 110 for allowing a user to input a control command to each of the home appliances 200 connected to the network N and displaying state information of each of the home appliances 200 operating operated in response to the control command, such that the user can check the state information/product information of each of the home appliances 200.

The home server 100 further includes a device control module 130 for performing a self-control function of the home server 100. The device control module 130 is adapted to perform the control operation of the home server 100 by generating a control signal in response to the user's control command inputted through the user interface module 110 and sending the generated control signal to a corresponding one of the home appliances 200.

The home server 100 further includes a device monitoring module 120 for separately storing the state information of the plurality of home appliances 200 connected to the network. If the state information of a specific one of the home appliances 200 is requested through the user interface module 110, the device control module 130 transfers the state information of the specific home appliance stored in the device monitoring module 120 to the user interface module 110, thereby making it possible to enhance a monitoring speed and control speed as compared with a conventional home appliance network system.

Therefore, the device control module 130 can read the state information of the plurality of home appliances 200 connected to the network N in real time through the device monitoring module 120 even without individual communications with the home appliances 200.

The home server 100 further includes a home appliance interface module 140 for performing transmission and reception of data between the device control module 130 and the plurality of home appliances 200 over the network N.

Figure 3:
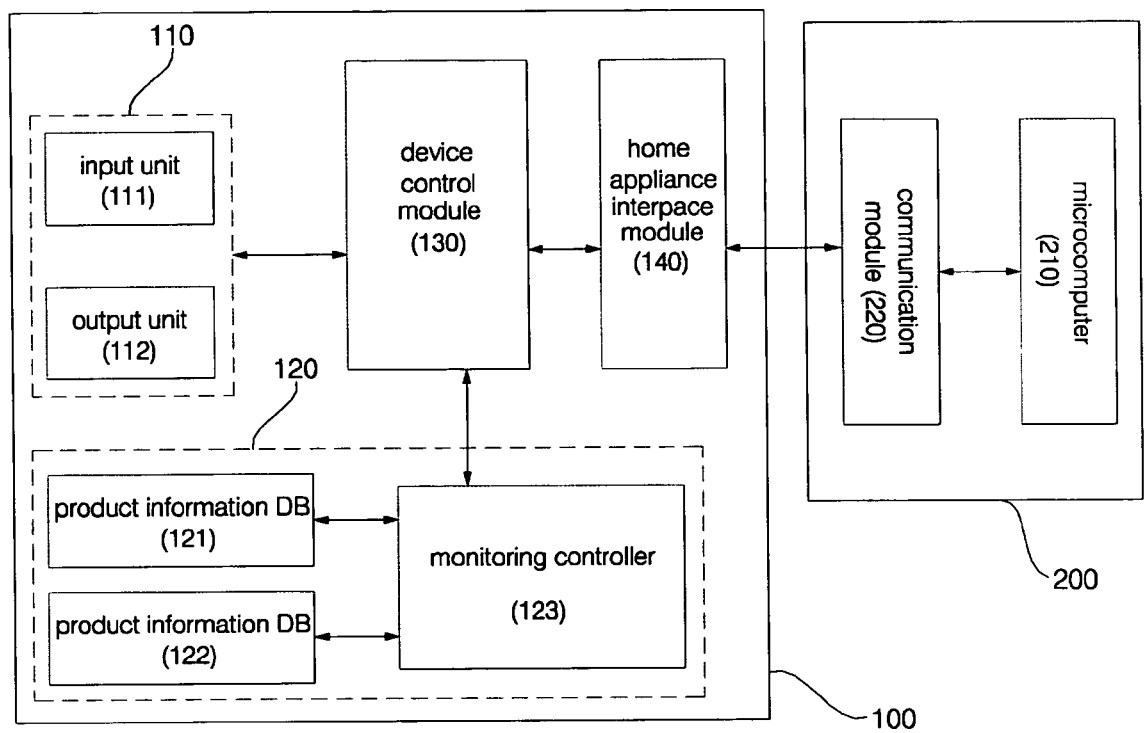
FIG. 3 is a block diagram showing the configuration of a first embodiment of the home appliance network system according to the present invention.

The construction of the home appliance network system shown in FIG. 2 will hereinafter be described in detail with reference to FIG. 3, which is a block diagram showing the configuration of a first embodiment of the home appliance network system according to the present invention.

In the home appliance network system according to the first embodiment, the home appliances 200 are adapted to transmit and receive data over the network constructed in the home, and the home server 100 is adapted to, over the network, control the operations of the home appliances 200 and monitor the states thereof, and independently store and update state information of the home appliances 200.

The home appliances 200 each include a microcomputer 210 for controlling the operation of a corresponding one of the home appliances 200 in response to a control command received over the network and, as needed, generating response data to the received control command and sending it to the home server 100, and a communication module 220 for transmitting and receiving data to/from the home server 100 over the network.

The home server 100 includes, as described above, the user interface module 110, device control module 130, home appliance interface module 140 and device monitoring module 120.

The user interface module 110 includes an input unit 111 for inputting a control command from the user, and an output unit 112 for outputting state information of a specific one of the home appliances 200, operated in response to the control command.

Preferably, the input unit 111 and output unit 112 of the user interface module 110 are configured integrally with each other or separately from each other in the home server 100. Alternatively, they may be configured separately from the home server 100.

The device monitoring module 120 functions to store and update the state information or product information of the specific home appliance based on the control command inputted through the input unit 111.

To this end, the device monitoring module 120 includes a monitoring controller 123 for analyzing the control command inputted through the input unit 111, transferring the state information or product information of the specific home appliance to the output unit 112 according to a result of the analysis, and updating respective product information or state information received from the home appliances 200.

The device monitoring module 120 further includes a product information database (DB) 121 for storing the product information of each of the home appliances 200 connected to the network. The product information of each of the home appliances 200 may contain, for example, a product type, model number and firmware version of a corresponding one of the home appliances 200. The device monitoring module 120 further includes a state information DB 122 for storing the state information which is received from each of the home appliances 200 connected to the network through the home appliance interface module 140. The state information of each of the home appliances 200 may contain, for example, on/off information, operation mode information, used resources information and power consumption information.

The home appliance interface module 140 is a kind of communication module which format-converts data between the home server 100 and each of the home appliances 200 such that the data is transmitted and received therebetween over the network. The home appliance interface module 140 is preferably provided in the home server 100. Alternatively, it may be an independent device which is configured separately from the home server 100 such that it is connectable to the home server 100 via a separate connector.

The device control module 130 functions to analyze the control command inputted through the input unit 111, and transfer the control command to the device monitoring module 120 if it is a command to request data of the specific home appliance and transfer it to the specific home appliance through the home appliance interface module 140 if it is a command to control the operation of the specific home appliance.

Figure 4:
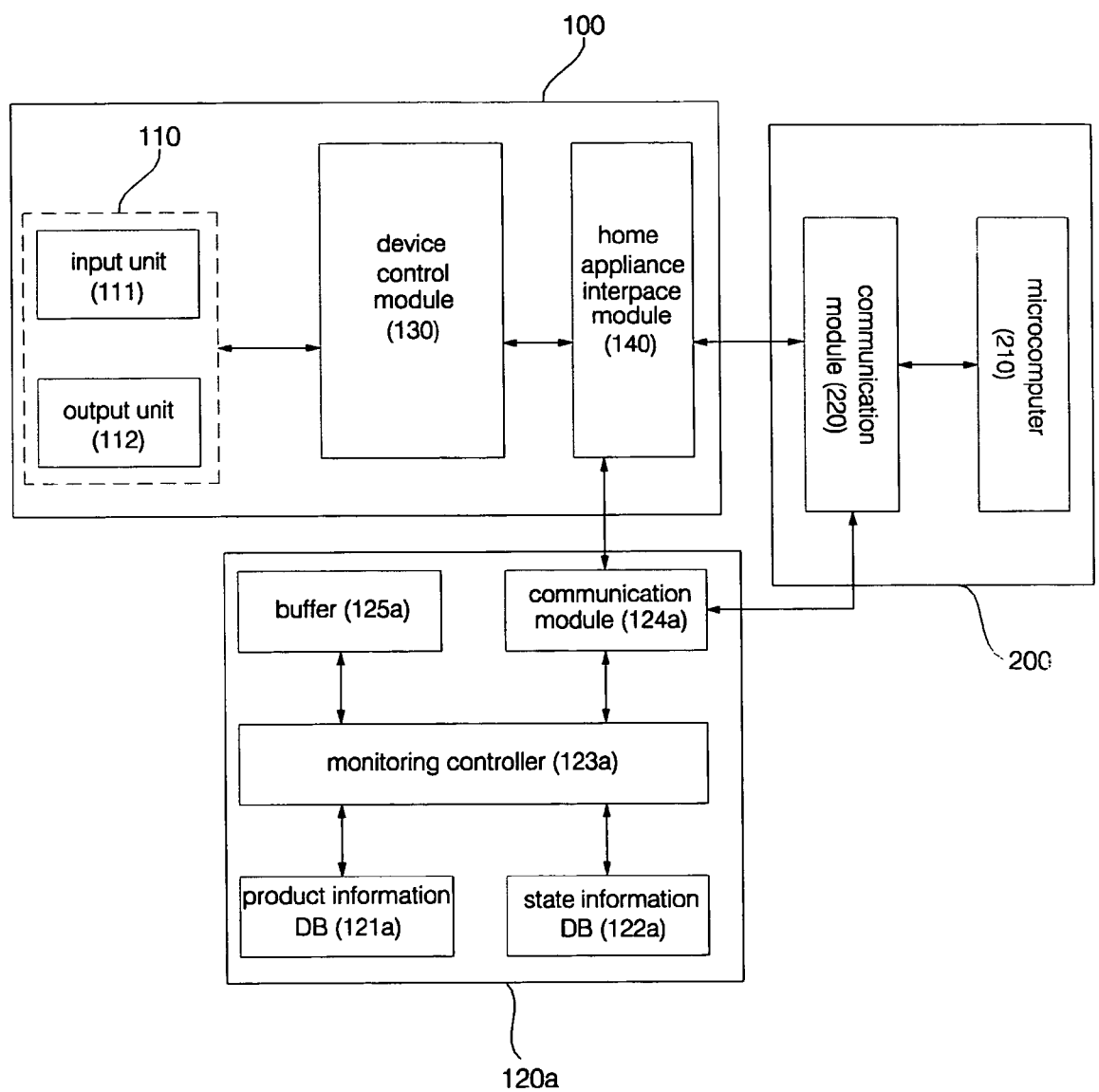
FIG. 4 is a block diagram showing the configuration of a second embodiment of the home appliance network system according to the present invention.

FIG. 4 is a block diagram showing the configuration of a second embodiment of the home appliance network system according to the present invention. The second embodiment is substantially the same in construction as the first embodiment, with the exception that the device monitoring module 120 is implemented as a monitoring server 120a which is configured separately from the home server 100.

The monitoring server 120a includes a monitoring controller 123a for updating the product information or state information of each of the home appliances 200 connected to the network if a change occurs therein, and sending the state information or product information of a specific one of the home appliances 200 to the home server 100 in response to a control command from the home server 100, and a communication module 124a for transmitting and receiving data to/from the home server 100 and the home appliances 200.

The monitoring server 120a further includes a state information DB 122a for storing the state information of each of the home appliances 200 connected to the network, and a product information DB 121a for storing the product information of each of the home appliances 200, and a buffer 125a for temporarily storing changed data of the product information or state information of each of the home appliances 200 to update the product information or state information if a change occurs therein.

The communication module 124a preferably includes a home appliance interface for format-converting data such that it is transmitted and received over the network. The communication module 124a may be implemented in different manners according to different schemes for connection with the home server 100. It may include one or more modems for format-converting data in different communication schemes, respectively.

A detailed description will hereinafter be given of the operation of the home appliance network system with the above-stated construction according to the present invention with reference to FIG. 5.

Figure 5:
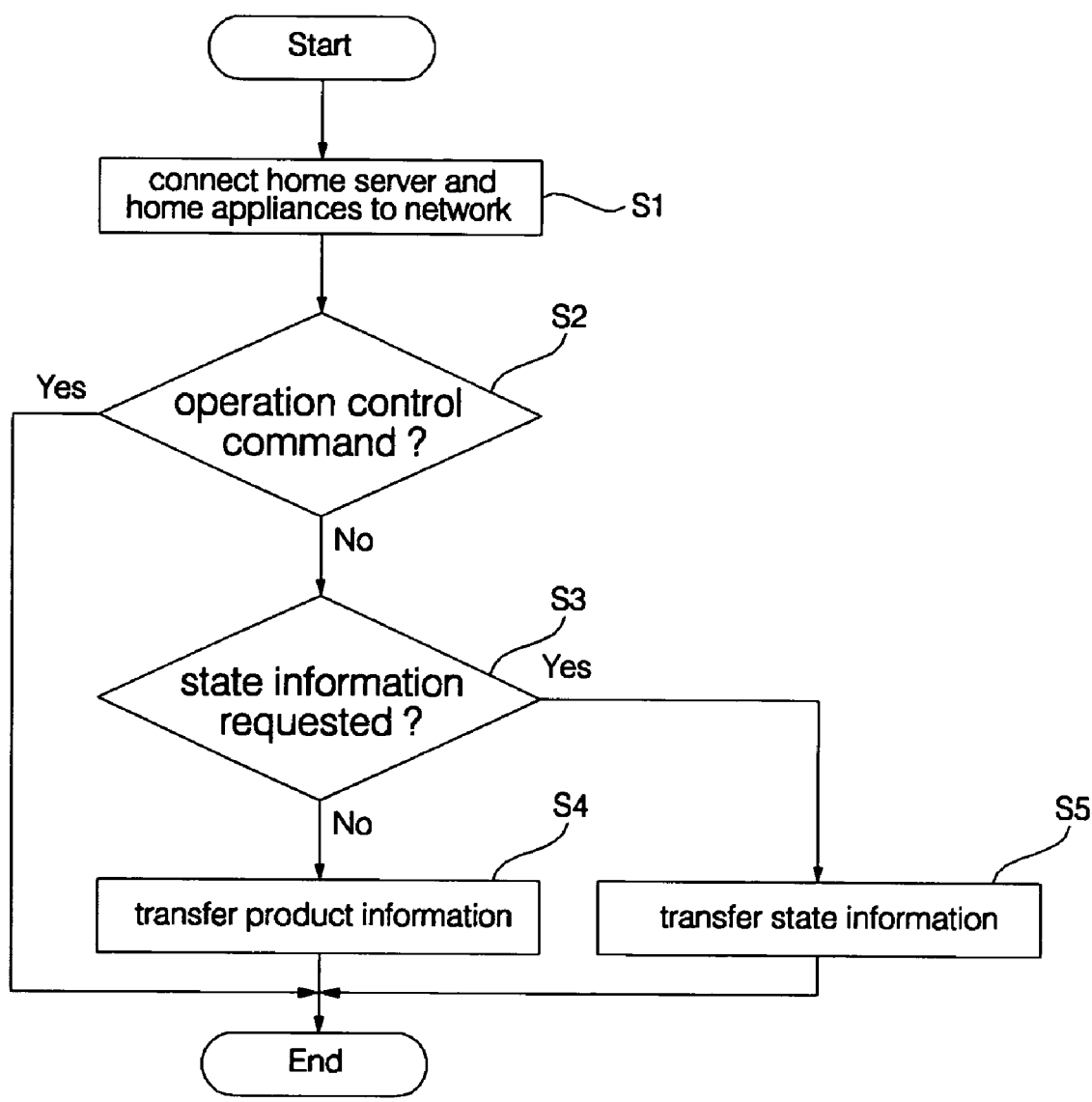
FIG. 5 is a flow chart illustrating the operation of the home appliance network system according to the present invention.

FIG. 5 is a flow chart illustrating a state monitoring operation of the home appliance network system according to the present invention.

First, if the home server and the home appliances are initially interconnected over the network, the home appliances each send product information and state information thereof to the device monitoring module (or monitoring server).

At this time, the device monitoring module (or monitoring server) does not merely store the state information of each of the home appliances, but independently manages/updates a response of each of the home appliances to a control command inputted through the user interface module of the home server, or information regarding an operating state of each home appliance or a change therein based on the user's manual operation with no use of the home server (S1).

Thereafter, if the user requests information of a specific one of the home appliances through the user interface module of the home server to control the specific home appliance, the device monitoring module (or monitoring server) determines whether the requested information is product information or state information of the specific home appliance (S2 and S3).

Then, the device monitoring module (or monitoring server) transfers the state information or product information of the specific home appliance to the user interface module, which then outputs the transferred information externally (S4 and S5).

If the user inputs a control command to control the specific home appliance, the home server generates a home appliance control signal in response to the inputted control command and sends the generated control signal over the network to the specific home appliance, which then performs an operation based on the transferred control signal.

As apparent from the above description, the present invention provides a home appliance network system and a method for operating the same, wherein a device monitoring module is provided in a home server to independently store and update state information of a plurality of home appliances connected to a network, thereby making it possible to rapidly display product information of the home appliances using a smaller amount of network system resources when user monitors the product information to control the home appliances, resulting in an increase in efficiency of home appliance control.

Further, where the device monitoring module is implemented as an independent monitoring server which is configured separately from the home server, it can manage data of the home appliances more efficiently and increase compatibility with other home appliance network systems.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present disclosure relates to subject matter contained in Korean Patent Application No. 10-2003-0070322, filed on Oct. 9, 2003, the contents of which are herein expressly incorporated by reference in its entirety.

What is claimed is:

1. A home appliance network system comprising:

a plurality of home appliances connected to said home appliance network system, wherein said home appliances transmit and receive data over the network; and a home server which controls the operations of said home appliances and monitors states thereof, said home server comprising:

a monitor which independently stores and updates state information or product information of said home appliances, and a controller which transfers the state information or product information of a specific one of said home appliances stored in said appliance monitor to an user interface, wherein said controller is configured to read the state information or product information of said home appliances in real time without directly communicating with said home appliances.

2. The home appliance network system as set forth in claim 1, wherein said monitor independently stores and updates product information or state information of said specific one of said home appliances based on an input control command.

3. The home appliance network system as set forth in claim 2, wherein said user interface is configured to allow input of said control command and output of the state information of said specific home appliance operated in response to said control command; and a home appliance interface module which transmits and receives data transferred between said controller and said home appliances, wherein the controller sends a control signal to said specific home appliance to control an operation of said specific home appliance in response to said control command inputted through said user interface.

4. The home appliance network system as set forth in claim 3, wherein said monitor includes a monitoring controller which analyzes said control command inputted through said user interface module and transfers the state information or product information of said specific home appliance to said user interface module according to a result of the analysis.

5. The home appliance network system as set forth in claim 4, wherein said monitor further includes:

a state information database which stores the state information of each of said home appliances connected to said network; and a product information database which stores product information of each of said home appliances.

6. The home appliance network system as set forth in claim 3, wherein said user interface module includes:

an input unit configured to allow input of said control command; and an output unit which receives and outputs the state information of said specific home appliance operated in response to said control command.

7. A home appliance network system comprising:

a plurality of home appliances connected to a network constructed in a home, which transmits and receives data over the network;

a home server which controls operations of said home appliances and monitors states thereof;

a monitoring server which independently stores and updates state information of said home appliances connected to said network and outputs information of a specific one of said home appliances in response to a control command from said home server;

wherein said home server comprises a controller which transfers the state information or product information of a specific one of said home appliances stored in said appliance monitoring server to an user interface, and wherein said controller is configured to read the state information or product information of said home appliances in real time without directly communicating with said home aipliances.

8. The home appliance network system as set forth in claim 7, wherein said monitoring server includes:

a state information database which stores the state information of each of said home appliances connected to said network;

a product information database which stores product information of each of said home appliances; and a microcomputer which updates the product information or state information of each of said home appliances connected to said network if a change occurs therein, and sends the state information or product information of said specific home appliance to said home server in response to said control command from said home server.

9. The home appliance network system as set forth in claim 8, wherein said monitoring server further includes a buffer which temporarily stores changed data of the product information or state information of each of said home appliances to update the product information or state information if a change occurs therein.

10. The home appliance network system as set forth in claim 9, wherein said monitoring server further includes a communicator which transmits and receives data to/from said home server and said home appliances.

11. The home appliance network system as set forth in claim 10, wherein said communication module includes a home appliance interface which is configured to allow format-converting of data such that it is transmitted and received over said network.

12. The home appliance network system as set forth in claim 7, wherein said user interface is configured to allow input of said control command and output of the state information of said specific home appliance operated in response to said control command;

a communicator which transmits and receives data to/from said monitoring server and said home appliances; and wherein said controller sends a control signal to said specific home appliance to control an operation of said specific home appliance in response to said control command inputted through said user interface.

13. A method for operating a home appliance network system, comprising:

a) connecting a plurality of home appliances and a home server to a network constructed in a home;

a-1) storing product information and state information of each of the home appliances connected to the network in a monitor which independently stores and updates state information or product information of the home appliances; and a-2), if a change occurs in the stored information, receiving changed information from each of the home appliances and updating the information stored in the monitor with the received information;

b) determining whether an external input control command is a command to request product information or state information of a specific one of the home appliances, and providing a controller which transfers the requested product information or state information from the monitor, the controller being configured to read the state information or product information of the home appliances in real time without directly communicating with the home appliances; and c) externally displaying the product information or state information of the specific home appliance according to a result of the determination.

14. The method as set forth in claim 13, wherein said determining further comprises:

b-1) determining whether the input control command is a command to control an operation of the specific home appliance or a command to monitor a state of the specific home appliance; and b-2), if the input control command is the monitoring command, determining whether the monitoring command is the command to request the product information or state information of the specific home appliance.

\* \* \* \* \*